(12) United States Patent
Spears

(10) Patent No.: US 6,760,139 B2
(45) Date of Patent: Jul. 6, 2004

(54) OPTICAL IMAGE SCANNER WITH LENS ARRAYS THAT ARE NON-PERPENDICULAR TO THE IMAGE BEING SCANNED

(75) Inventor: Kurt E. Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/842,306

(22) Filed: Apr. 25, 2001

(65) Prior Publication Data

US 2002/0159124 A1 Oct. 31, 2002

(51) Int. Cl.[7] .............................................. G02B 26/08
(52) U.S. Cl. ....................... 359/223; 359/204; 347/259; 358/497
(58) Field of Search ................................ 359/196, 204, 359/205, 212, 223; 347/256, 258, 259; 358/497

(56) References Cited

U.S. PATENT DOCUMENTS

| | | | | |
|---|---|---|---|---|
| 3,658,407 A | | 4/1972 | Kitano et al. | |
| 4,623,937 A | * | 11/1986 | Watanabe | 358/483 |
| 4,752,808 A | * | 6/1988 | Lemelson | 358/300 |
| 5,696,609 A | * | 12/1997 | Cresens et al. | 358/475 |
| 5,748,805 A | * | 5/1998 | Withgott et al. | 382/306 |
| 5,751,447 A | * | 5/1998 | Brook et al. | 358/487 |
| 6,154,247 A | * | 11/2000 | Marino et al. | 347/256 |
| 6,603,580 B1 | * | 8/2003 | Taillie | 358/474 |
| 2002/0075525 A1 | * | 6/2002 | Lichtfuss | 358/475 |

FOREIGN PATENT DOCUMENTS

| | | | |
|---|---|---|---|
| JP | 8018747 A | 1/1996 | |
| JP | 2001024847 | 1/2001 | .......... H04N/1/028 |

* cited by examiner

*Primary Examiner*—Mark A. Robinson
(74) *Attorney, Agent, or Firm*—Augustus W. Winfield

(57) ABSTRACT

An optical image scanner uses one or more reflecting surfaces to provide a light path through a lens array, where the optical path through the lens array is non-perpendicular to the surface of the image being scanned. As a result, the distance, from the surface where an image is being scanned, to the opposite outer surface of the scanner, is relatively short compared to scanners in which lens arrays are perpendicular to the image being scanned. An illumination source may be provided as part of an assembly that includes the lens array. Alternatively, the assembly may be integrated with a video display, or placed adjacent to a video display, and the video display may be used as the illumination source. The assembly may optionally monitor the intensity and color of the illumination source during scanning. The assembly may also optionally image the display.

5 Claims, 6 Drawing Sheets

OPTICAL IMAGE SCANNER WITH LENS ARRAYS THAT ARE NON-PERPENDICULAR TO THE IMAGE BEING SCANNED

FIELD OF INVENTION

This invention relates generally to optical image scanners and more specifically to an optical image scanner using lens arrays, where the distance, from the surface where an image is being scanned, to the opposite outer surface of the scanner, is relatively short.

BACKGROUND OF THE INVENTION

Image scanners, also known as document scanners, convert a visible image on a document or photograph, or an image in a transparent medium, into an electronic form suitable for copying, storing or processing by a computer. An image scanner may be a separate device, or an image scanner may be a part of a copier, part of a facsimile machine, or part of a multipurpose device. Reflective image scanners typically have a controlled source of light, and light is reflected off the surface of a document, through an optics system, and onto an array of photosensitive devices. Transparency image scanners pass light through a transparent image, for example a photographic positive slide, through an optics system, and then onto an array of photosensitive devices. The optics system focuses at least one line, called a scanline, on the image being scanned, onto the array of photosensitive devices. The photosensitive devices convert received light intensity into an electronic signal. An analog-to-digital converter converts the electronic signal into computer readable binary numbers, with each binary number representing an intensity value.

There are two common types of image scanners. In a first type, the length of the photosensor array is much less than the length of the scanline. For the first type, a spherical reduction lens is commonly used to focus the scanline onto the photosensor array. In a second type, the length of the photosensor array is the same length as the scanline. For the second type, it is common to use Selfoc® lens arrays (available from Nippon Sheet Glass Co.), in which an array of rod-shaped lenses is used, typically with multiple photosensors receiving light through each individual lens. The optical path length (the distance from the image being scanned to the photosensor array) of Selfoc lens arrays is relatively short compared to the optical path length of a spherical reduction lens. For example, the typical optical path length for a reduction lens in an image scanner is hundreds of millimeters, and the typical optical path length for a Selfoc lens array is tens of millimeters. However, there is a need for even smaller scanners, for example, for use with portable digital personal appliances.

SUMMARY OF THE INVENTION

An optical image scanner uses one or more reflecting surfaces to provide a light path through a lens array, where the optical path through the lens array is non-perpendicular to the surface of the image being scanned. As a result, the distance, from the surface where an image is being scanned, to the opposite outer surface of the scanner, is relatively short compared to scanners in which lens arrays are perpendicular to the image being scanned. An illumination source may be provided as part of an assembly that includes the lens array. Alternatively, the assembly may be integrated with a video display, or placed adjacent to a video display, and the video display may be used as the illumination source. For example, a scanner may be used in conjunction with a hand-held computer, or with a digital photo frame. The assembly may optionally monitor the intensity and color of the illumination source during scanning. The assembly may also optionally image the display, enabling screen prints, or remote scanning of a computer screen for technical assistance.

DETAILED DESCRIPTION OF THE PREFERRED EMBODIMENT OF THE INVENTION

Figure 1:
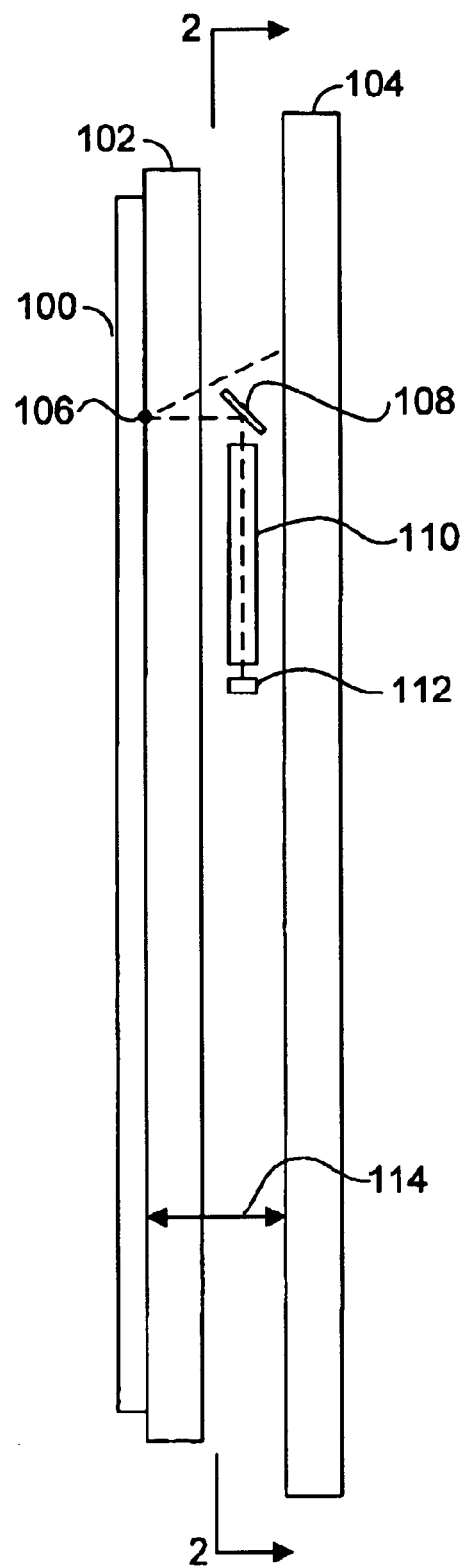
FIG. 1 is a block diagram side view of an example embodiment of an optical image scanner with a lens array that is non-perpendicular to the image being scanned, in accordance with the invention.

FIG. 1 illustrates an example embodiment of a scanner assembly for which a video display is used as a light source. In FIG. 1, a document 100 is placed against a transparent platen (or faceplate) 102. Light from a video display 104 is scattered from a scanline (represented by a dot 106). A reflective surface 108 reflects some of the light scattered from scanline 106 through a lens array 110 to a photosensor array 112. The lens array 110 focuses the scanline 106 onto the photosensor array 112. By orienting the lens array 110 so that it is non-perpendicular to document 100 (lens array 110 is substantially parallel to document 100 in FIG. 1), the distance from the document 100 to the video display 104 (indicated by double arrow 114) is limited by the thickness of the lens array 110 instead of the length of the lens array 110.

Figure 2:
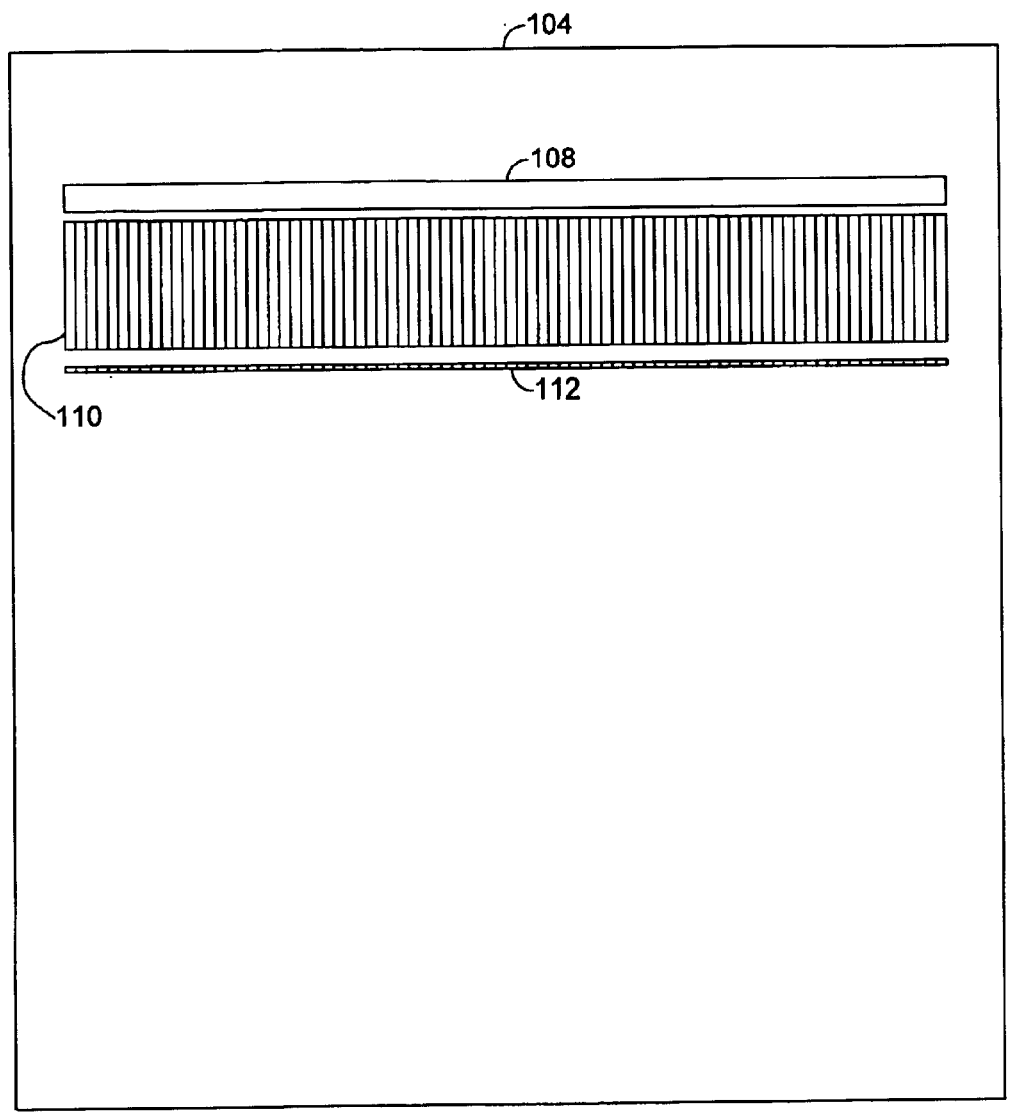
FIG. 2 is a section view of the optical image scanner of FIG. 1.

FIG. 2 illustrates that the lens array 110 and photosensor array 112 preferably extend over the width of the image to be scanned. That is, the lens array 110 and photosensor array are preferably as wide as the scanline. The reflective surface 108 may be a single continuous surface, as illustrated, or each lens may have a separate reflective surface.

For scanning, the reflective surface 108, lens array 110, and photosensor array 112 may be moved as an assembly relative to the document 106, moving the scanline 106 along the document. Alternatively, the reflective surface 108, lens array 110, and photosensor array 112 may remain stationary, and the document 100 may be moved relative to the assembly.

The reflective surface 108 may optionally swivel, so that a scanline on the face of the video display 104 is focused onto the photosensor array 112. This would enable screen prints, or remote scanning of a computer screen for technical assistance. The reflective surface 108 may comprise a total internal reflection surface (for example, an internal surface of a prism), or may comprise a mirror with a reflective coating (for example, an aluminum or other metallic coating).

In the configuration illustrated in FIG. 1, the video display 104 may be the face of a cathode ray tube (CRT). Alternatively, the video display 104 may be a backlit liquid crystal display (LCD), such as the displays commonly used in portable computers and digital photo frames. Alternatively, the video display 104 may be a plasma display, or an electroluminescent display, or any other display technology that can illuminate the document 100.

The platen 102 along with the reflective surface 108, lens array 110, and photosensor array 112 may be attached to the video display 104 to provide a combination display/scanner. Alternatively, the platen 102 along with the reflective surface 108, lens array 110, and photosensor array 112 may be a separate assembly that is temporarily placed against the video display 104.

The lens array 110 may be a fiber optic bundle or other light pipe technology. However, Selfoc lens arrays have advantages related to viewing angle, depth of field, and magnification. Each Selfoc rod-shaped lens has a index of refraction that varies radially. As a result, they have many of the attributes of a spherical lens, as opposed to just piping light. In particular, a real image (inverted or erect) can be formed on the photosensor array. A real image is required if one lens is used for multiple photosensors. In addition, other embodiments, described below, take advantage of real image formation for monitoring the intensity of the light source.

Figure 3:
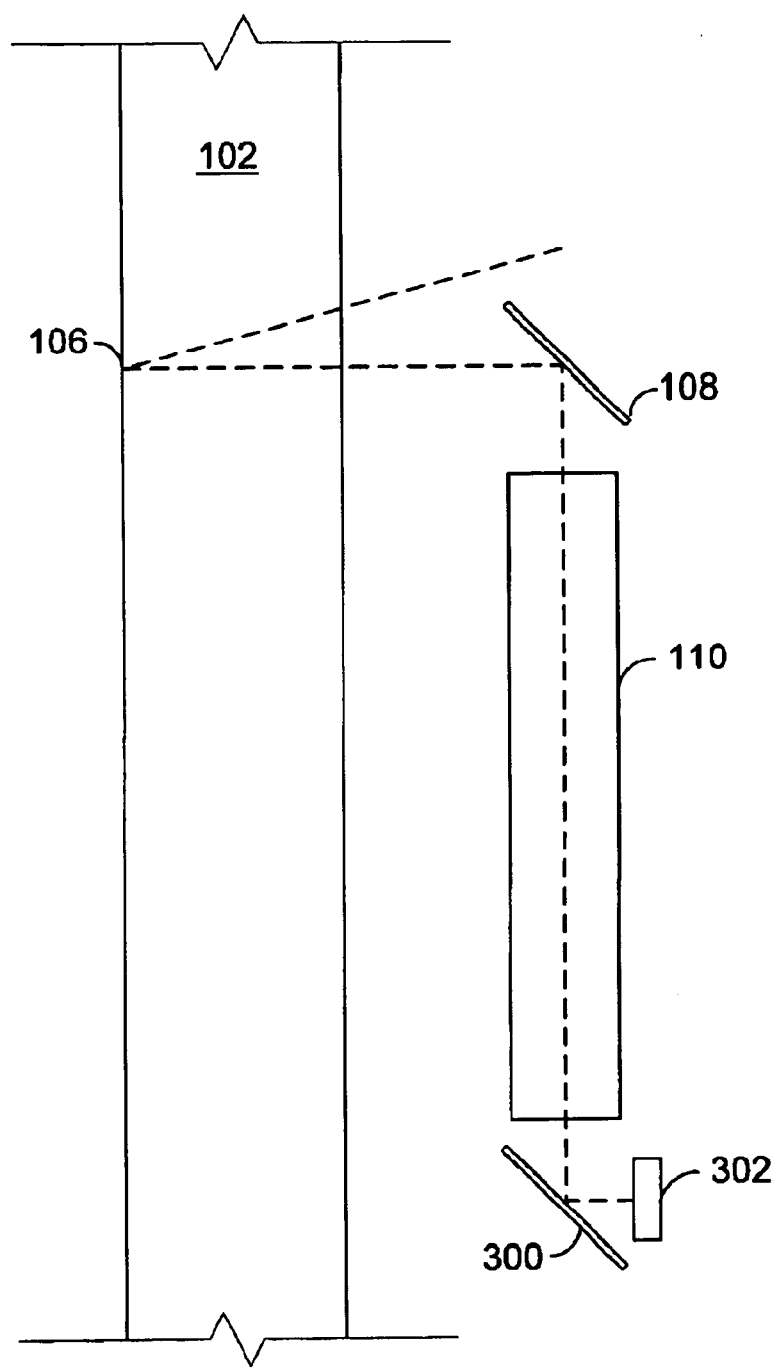
FIG. 3 is a block diagram side view of an alternative configuration for the photosensor array, in accordance with the invention.

FIG. 3 illustrates an alternative configuration in which a second reflective surface 300 is used to redirect light onto a photosensor array 302. The orientation of the photosensor array 302 in FIG. 3 may be preferred for mounting the photosensor array onto a printed circuit board.

Figure 4:
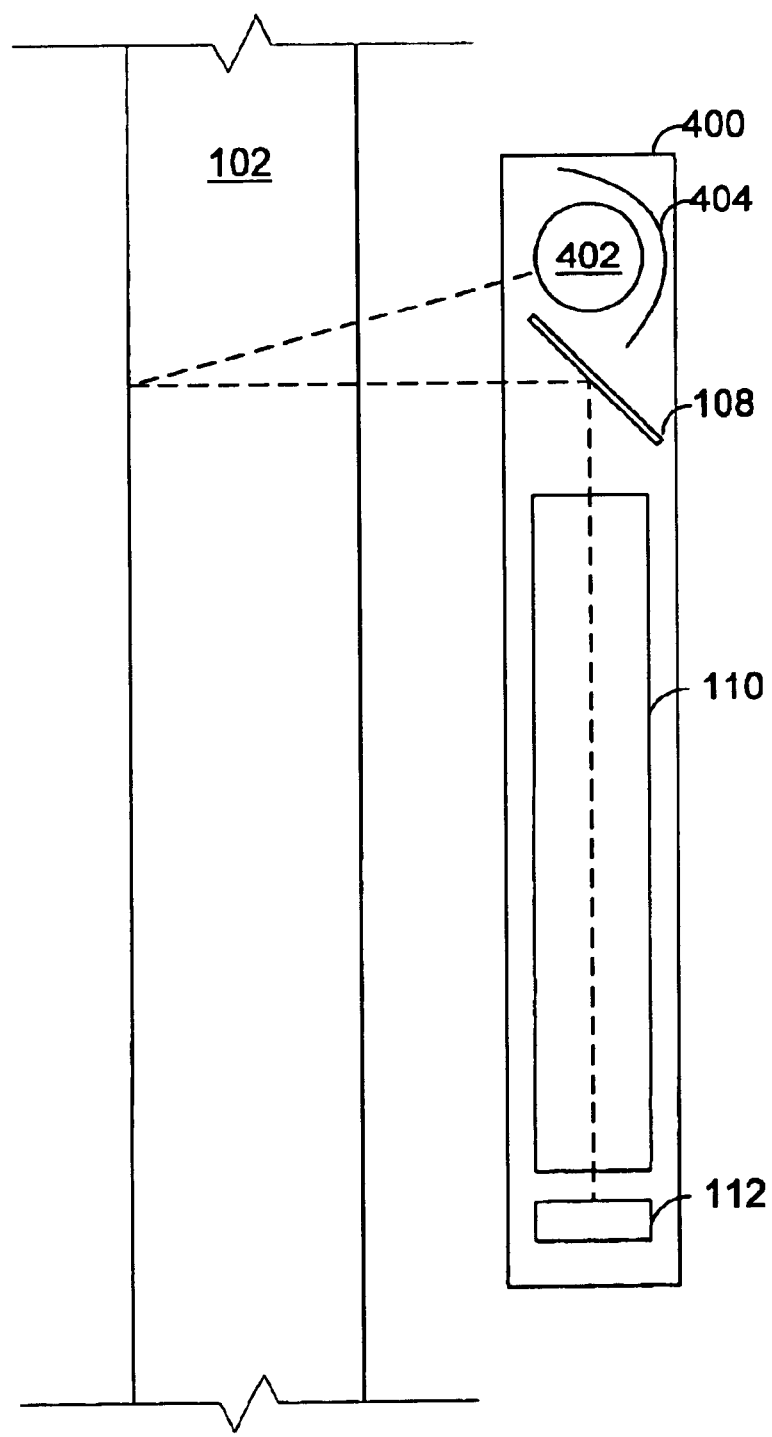
FIG. 4 is a block diagram side view of an alternative configuration for illumination, in accordance with the invention.

FIG. 4 illustrates that the assembly may optionally include a source of illumination. In FIG. 4, an assembly 400 includes a lamp 402, in a reflector 404, for illuminating the image being scanned. Preferably, the lamp 402 is substantially at least as long as the scanline. The lamp 402 may be, for example, a cold-cathode fluorescent lamp, Light Emitting Diodes (LED's), a Xenon lamp, or any other relatively small light source.

For electric discharge lamps, such as cold-cathode fluorescent lamps and Xenon lamps, intensity and color is a function of power and temperature. The temperature of the vapor or gas, and the phosphors, indirectly affects intensity. Because of thermal time constants in the lamp, when such a lamp is first powered on, light intensity and color vary dynamically along the length of the tube until the overall temperature of the light source stabilizes. The time required for complete stabilization may be on the order of many minutes. Image scanners using such a light source typically wait for some stabilization before scanning the document, typically for at least tens of seconds. Alternatively, a scanner may start scanning without waiting for the lamp to warm up, and then monitor the lamp intensity during scanning. Compensation values may then be updated during scanning. In an earlier application from the same assignee, {Ser. No. 09/772, 714, filed Jan. 30, 2001}, one photosensor array is focused onto a scanline during scanning, and a separate photosensor array is used to monitor the lamp during scanning.

Figure 5:
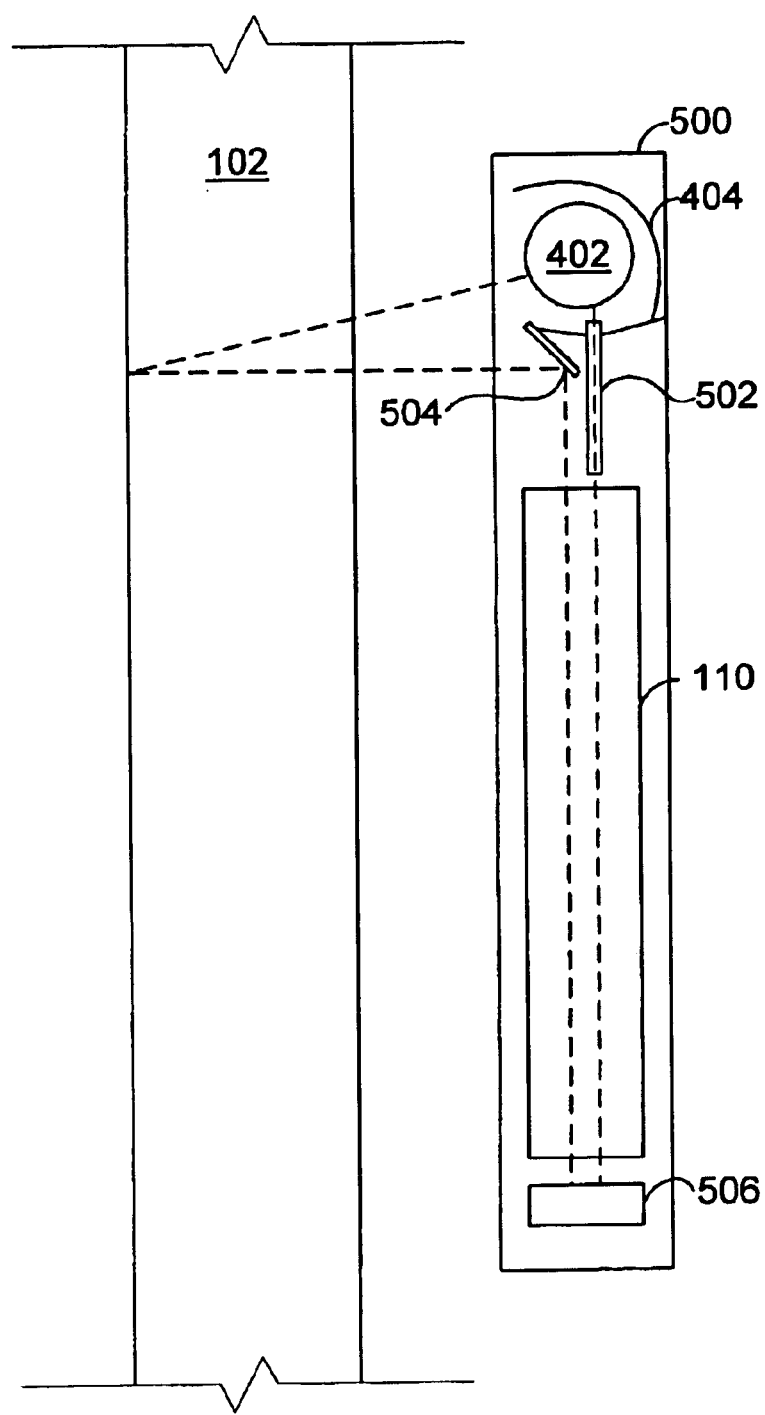
FIG. 5 is a block diagram side view of an alternative configuration permitting monitoring of lamp illumination during scanning, in accordance with the invention.

FIG. 5 illustrates an alternative embodiment in which the lamp can be monitored during scanning. In FIG. 5, an assembly 500 includes a neutral density light pipe 502 that directs light, directly from the lamp 402, or from the reflector 404, into the lens array 506. Light from the lamp is blocked from entering the lens array 502 other than through the light pipe 502 or from a scanline. The light pipe 502 preferably spans substantially the length of the scanline, but does not have to be continuous. That is, the light pipe needs to monitor at least at area near one end of the lamp, and preferably an area near the center of the lamp, but does not have to monitor every part of the length of the lamp. The reflecting surface 504 directs light from a scanline into the lens array 110. Recall from the above discussion that a Selfoc lenses form a real image on the photosensor array. Accordingly, separate images of light from the lamp, and the scanline, are formed onto the photosensor array 506. Photosensor array 506 has two separate rows of photosensors, one for the scanline and one for lamp sensing. In general, a photosensor array for lamp sensing does not have to be continuous, and may be relatively low resolution compared to a photosensor array for a scanline. The light path for monitoring the lamp will have an identical focal length as the light path for the scanline. However, the light pipe 502 does not have to form an image, but only needs to provide diffuse intensity and color. Note that in FIG. 5, the lens array 506 is depicted as providing an erect (non-inverted) image on the photosensor array 506. Typically, for document scanners, the lens arrays provide a 1:1 erect image. However, lens arrays may also be configured to provide inverted images with magnification, in which case the light from the scanline and lamp would pass at a slight angle through the lens instead of in a straight line as illustrated.

Figure 6:
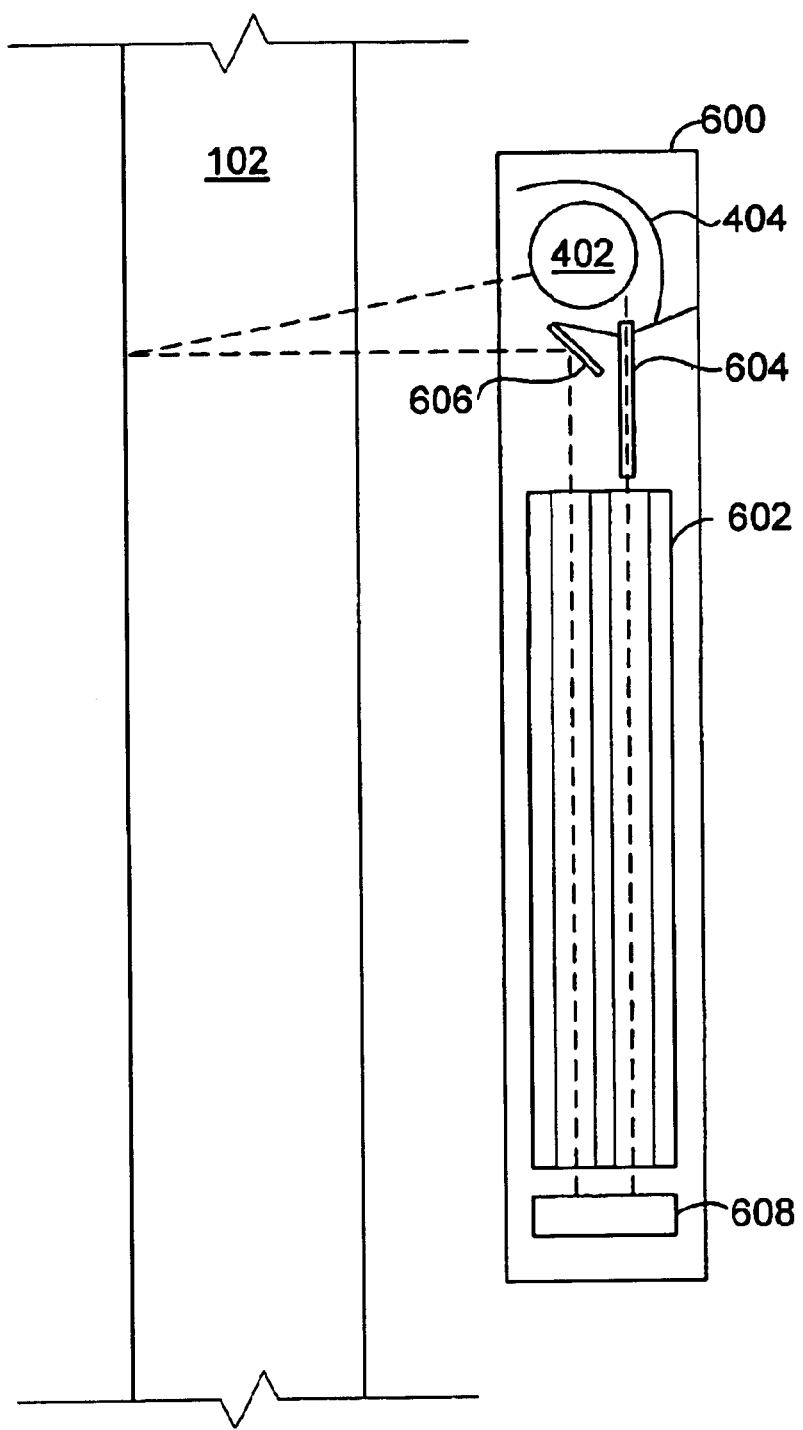
FIG. 6 is a block diagram side view of a variation of the configuration of FIG. 5, in accordance with the invention.

FIG. 6 illustrates a variation of the embodiment of FIG. 5. In FIG. 6, an assembly 600 includes a lens array 602 that has two rows of lenses. Reflecting surface 606 directs light from a scanline into one row of lenses and onto one row of photosensors on photosensor array 608. A neutral density light pipe 604 directs light from the lamp 402, or the reflector 404, into a second row of lenses, and onto a second row of photosensors on photosensor array 608. Note that the row of lens for monitoring the lamp do not have to be image forming lenses, but may instead may be light pipes.

Any of the example configurations illustrated in FIGS. 4, 5 and 6 may have a photosensor array oriented as illustrated in FIG. 3. That is, a second reflecting surface may be added so that the photosensor array can be oriented parallel to the image being scanned.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An image scanner, comprising:

at least two lenses, wherein optical axes for the lenses are not coincident; and at least one reflecting surface, wherein light, from a scanline on a surface being scanned, is directed by the reflecting surface through the lenses;

wherein light, through the lenses, from the scanline, originates from a video display; and, wherein the reflecting surface can be reoriented to direct light from the video display, through the lenses, instead or light from the scanline being directed through the lenses.

2. An image scanner, comprising:

a first surface and a second surface, the first and second surfaces substantially parallel;

a lens array between the two surfaces; and a reflecting surface, that can be oriented to a first position, at which light is directed from the first surface through the lens array, and that can be oriented to a second position, at which light is directed from the second surface through the lens array.

3. The image scanner of claim 2, further comprising:

one of the first surface and the second surface is a display.

4. An image scanner, comprising:

a first surface and a second surface, the first and second surfaces substantially parallel;

a lens array between the two surfaces; and a reflecting surface having a first position and a second position, where when the reflecting surface is at the first position light is directed from the first surface through the lens array, and when the reflecting surface is at the second position, light is directed from the second surface through the lens array.

5. The image scanner of claim 4, further comprising:

one of the first surface and the second surface is a display.

* * * * *